(12) United States Patent
Russell et al.

(10) Patent No.: US 6,545,214 B2
(45) Date of Patent: Apr. 8, 2003

(54) BUILDING UTILITY UPGRADING DEVICE AND METHOD

(76) Inventors: Michael J. Russell, 871 Mt. Ranier Way, El Dorado Hills, CA (US) 95762; Katherine H. Russell, 871 Mt. Ranier Way, El Dorado Hills, CA (US) 95762

(*) Notice: Subject to any disclaimer, the term of this patent is extended or adjusted under 35 U.S.C. 154(b) by 0 days.

(21) Appl. No.: 09/775,726

(22) Filed: Feb. 5, 2001

(65) Prior Publication Data

US 2002/0144833 A1 Oct. 10, 2002

(51) Int. Cl.[7] .................................................. H02G 3/10
(52) U.S. Cl. .............................. 174/48; 174/49; 174/58; 220/3.3
(58) Field of Search ......................... 174/48, 49, 60, 174/67, 50, 53, 58; 220/3.2, 3.3, 3.8, 4.02, 4.01, 3.5, 3.6, 3.7; 52/220.1, 220.3, 220.5, 220.7; 29/271, 273, 857

(56) References Cited

U.S. PATENT DOCUMENTS

| | | | | |
|---|---|---|---|---|
| 2,881,924 A | * | 4/1959 | Kruse et al. | 174/58 |
| 3,697,667 A | * | 10/1972 | Pollack et al. | 174/101 |
| 4,952,163 A | * | 8/1990 | Dola et al. | 174/48 |
| 5,009,383 A | * | 4/1991 | Chapman | 248/27.1 |
| 5,114,105 A | * | 5/1992 | Young | 248/906 |
| 5,295,644 A | * | 3/1994 | Ferguson, Jr. | 248/27.1 |
| 5,336,849 A | * | 8/1994 | Whitney | 174/48 |
| 5,732,747 A | * | 3/1998 | Holliday | 174/48 |
| 5,886,295 A | * | 3/1999 | Carino et al. | 174/48 |
| 5,957,414 A | * | 9/1999 | Perrignon de Troyes et al. | 174/101 |
| 6,180,878 B1 | * | 1/2001 | Gretz | 174/48 |
| 6,192,640 B1 | * | 2/2001 | Snyder | 220/3.5 |
| 6,209,836 B1 | * | 4/2001 | Swanson | 174/54 |
| 6,238,243 B1 | * | 5/2001 | Lorenz et al. | 439/551 |
| 6,239,365 B1 | * | 5/2001 | McEvers | 174/50 |
| 6,259,020 B1 | * | 7/2001 | Ashline et al. | 174/48 |
| 6,323,424 B1 | * | 11/2001 | He | 174/58 |

* cited by examiner

Primary Examiner—Dean A. Reichard
Assistant Examiner—Angel R. Estrada
(74) Attorney, Agent, or Firm—Mark C. Jacobs (57) ABSTRACT

A device to permit upgrading of a building's utilities, as well as the addition thereto, such as but not limited to phone, tv, and electrical supply, to be inserted into new or preexisting sheet rock, or above or below the sheet rock to blend into the crown molding or baseboard as may be present. The device has a base frame to be attached to the studs in a cutout in the sheet rock, and which is sized in elevation to receive standard electrical boxes, and sized in width to preferably fit between adjacent studs, such as but not limited to 16 and 24 inches on center. A cover member element, has one edge located spline or a pair of spaced splines, each of which present matingly engages a respective slot formed in and extending forwardly on the base frame. In those areas along the length of the base frame occupied by utility boxes with components disposed therein, such components are covered over by standard electrical box cover plates which are attached in conventional fashion. The cover member(s) which occupy the balance of the length of the base frame is preferably chamfered at the upper and lower edges to conform to contour to the conventional cover plates.

21 Claims, 8 Drawing Sheets

BUILDING UTILITY UPGRADING DEVICE AND METHOD

FIELD OF INVENTION

This application relates to a device to permit easy installation and upgrading of a building's utilities including phone, tv, and electrical as well as computer networking among others.

BACKGROUND OF INVENTION

In the 21$^{st}$ century era of advanced information management, people are subjected to reduced work space in the form of a work station, the need to network computers, increase phone line capacity, not just for businesses but for upscale homes as well. Office managers as well as business men and women at home, all want to upgrade the utilities in one or more rooms with a minimum of interruption and mess to the room where the upgrades are to take place.

This invention solves this dilemma by creating a mechanism for improvement to alarm systems, computer networks, phone line access, the provision of additional electrical outlets, tv and cable, all of which can be added at any point in time once a wall has been subjected to the device of this invention.

A major benefit that is obtained by the use of the device of this invention is the fact that the addition of the new utility access points, such as AC outlets or TV jacks etc., can be achieved under the guise of inchold workinch, a classification term used by the building departments of cities and towns to signify that the drywall is already in position prior to the addition of the new utility access points be they cable, sound, AC, etc. This is true even for new construction, as no cutouts need be left by the dry wall installers for occupation by electrical boxes. This is true, since the electrical boxes are placed within the device of this invention, after the drywall is complete.

The electrician need not worry about recessed boxes being accidentally covered over by sheet rock, and the sheet rock crew need not worry about making cutouts for the electrician. Each trade does its entire job sequentially, rather than in a rotating fashion.

The installation of the device of this invention will provide the building owner with the ability to accommodate the increased need for technology by permitting the incorporation of new technology such as computer networking, as well as providing a mode for greater space density by the addition of more phone and electrical outlets in a low cost efficient manner in an aesthetically pleasing manner.

While applicant believes the device of this invention to be new useful and unobvious, a brief search of possible prior art yielded the following United States patents:

| | | |
|---|---|---|
| CARLSON | 5,942,729 | Aug. 24, 1999 |
| RUSSO et al | 5,942,724 | Aug. 24, 1999 |
| HOUSSIAN | 5,835,980 | Nov. 10, 1998 |
| GARTUNG et al | 5,831,211 | Nov. 3, 1998 |
| HINER | 5,653,061 | Aug. 5, 1997 |
| WHITNEY | 5,336,849 | Aug. 9, 1994 |
| HOLTZ | 5,327,682 | July 12, 1994 |
| BROWN | 4,970,836 | Nov. 20, 1990 |
| SACHS | 4,890,418 | Jan. 2, 1990 |
| BOADEN et al | 3,983,671 | Oct. 5, 1976 |

None of these patents either singly or in combination anticipates the device of this invention, nor is the invention to be deemed obvious from any or more of these patents taken together.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF INVENTION

A device to permit the upgrading of the utilities of disposed in a wall of a building comprising a utility access receiver or base frame that is inserted into a slit cut into the sheet rock of a wall for retrofit, or which device is placed into a wall prior to the application of sheet rock in new construction, to permit utilities connections to be added to a room. Correct sized and contoured cover members are engaged with the base frame between and adjacent component installation to provide a clean attractive wall. The cover member matingly engages the base frame by way of at least one and preferably a pair of edge located spaced splines engaging suitably positioned spaced slots on the base frame. In those areas along the length of the base frame where utility boxes having utility components therein are positioned, a conventional electrical box cover plate is disposed over each box, and mounted thereto, with the balance of the length of the base frame having the cover member(s). The process of adding this device to a wall requires only the use of a readily available saw, and standard screwdrivers.

It is a first object therefore to provide a new mode of upgrading existing properties for the addition of various electrical and other components.

It is a second object to provide a process for upgrading old construction as well as for adding a mode for new construction to add electrical components, of both high and low voltage types, in a safe and efficient manner, that also permits future additions of components as may be needed.

It is a third object to provide a two-piece system for the receipt and retention of electrical components, of both high and low voltage varieties, which components may be visible for use; or in the case of electrical or other components that need only be accessed in emergency, for the placement thereof in a nonvisible readily accessible environment.

It is a fourth object to provide an easy to install means and method which is low in price for the receipt and retention of electrical and other utility components in a building.

Other objects of the invention will in part be obvious and will in fact appear hereinafter.

DESCRIPTION OF PREFERRED EMBODIMENT

Figure 1:
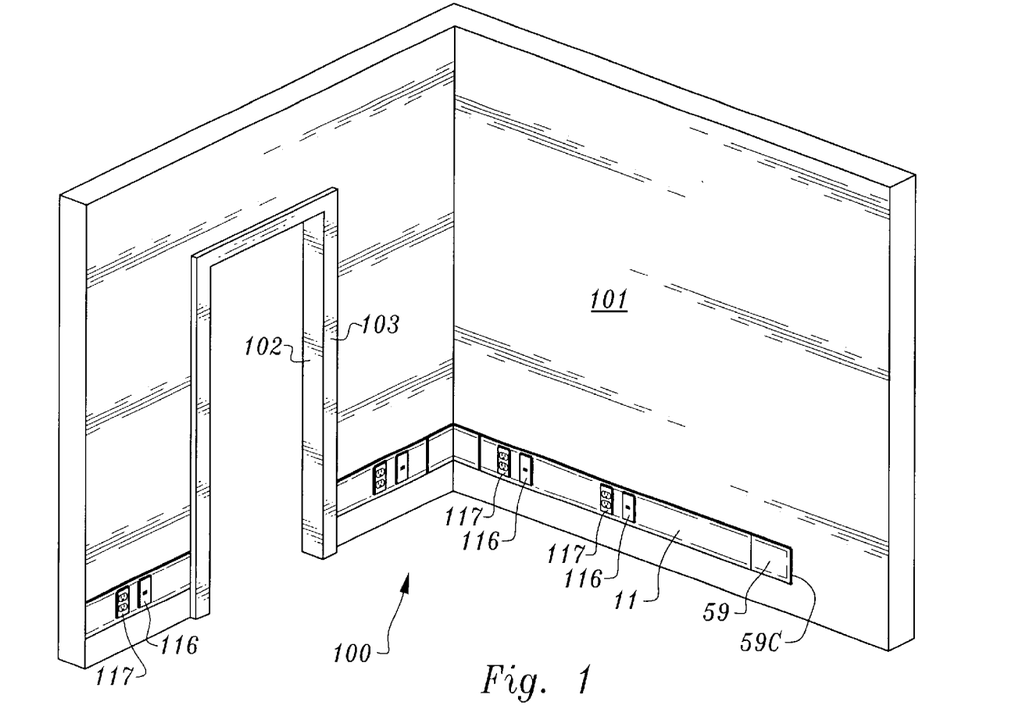
FIG. 1 is a perspective of two adjoining walls of a room to be upgraded.

In FIG. 1, two walls 101 of typical room 100 are seen after the upgrade of various utilities at specific location on the wall 101. In this view the doorway is designated 102 and the door jam trim is designated 103.

Figure 2:
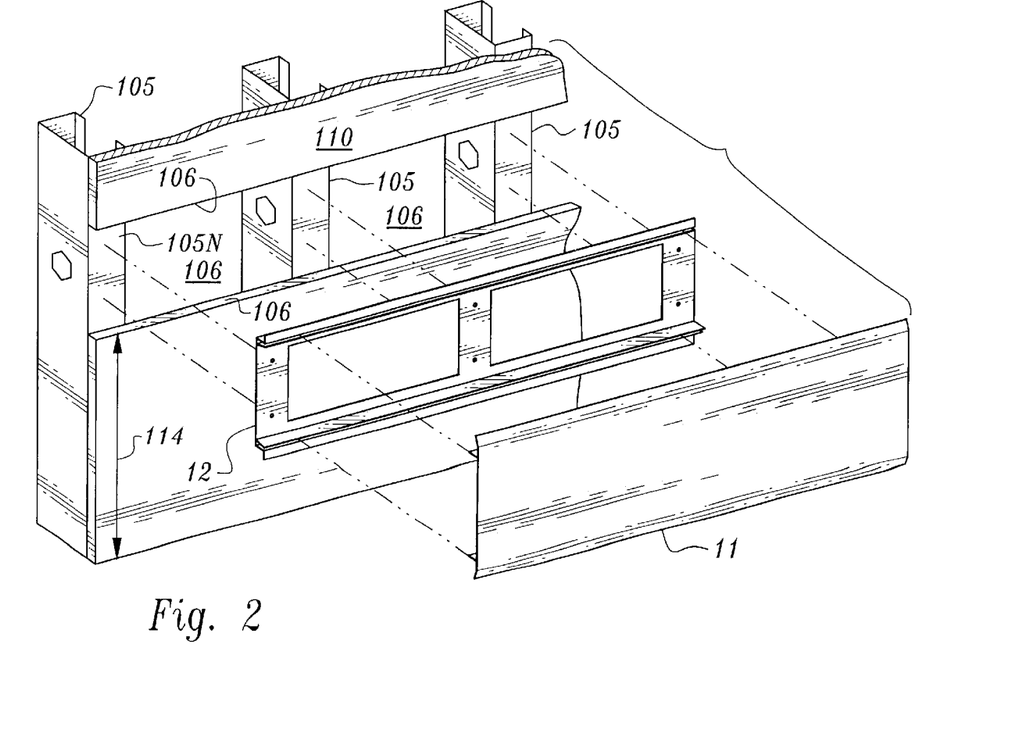
FIG. 2 is a perspective exploded view of the two key components of this invention.

In FIG. 2, the device 10's base frame 12 first component and the cover member also referred to as the snap on cover 11 of the first embodiment are seen ready to be installed.

The discussion will now turn to the METHOD of installing the base frame prior to going into the details of this first component. The method recited pertains to both embodiments discussed herein. Embodiment one is referred to by designator 10, while embodiment two is referred to by designator 200.

In a retrofit situation for either embodiment's device, but shown here, is device 10, a slit equal to the height or elevation of the base frame 12, is cut into sheet rock 110 between a pair of studs 105, here metal studs. Note that the studs are not cut, as the base frame fits over the narrower dimension face of the stud 105 designated 105N.

The slot 106 needed to receive the base frame may be easily cut using conventional power and/or hand-operated tools such as a scroll saw or a sheet rock saw, or a saber saw.

In new construction, the base frame is placed in position between two adjacent spaced studs 105 prior to the application of the sheet rock 110.

It is believed that an elevation of about 18 inches above the floor, as designated by arrows 114 is preferred for the installation of the base plate but is not required and is thus not critical.

Figure 3:
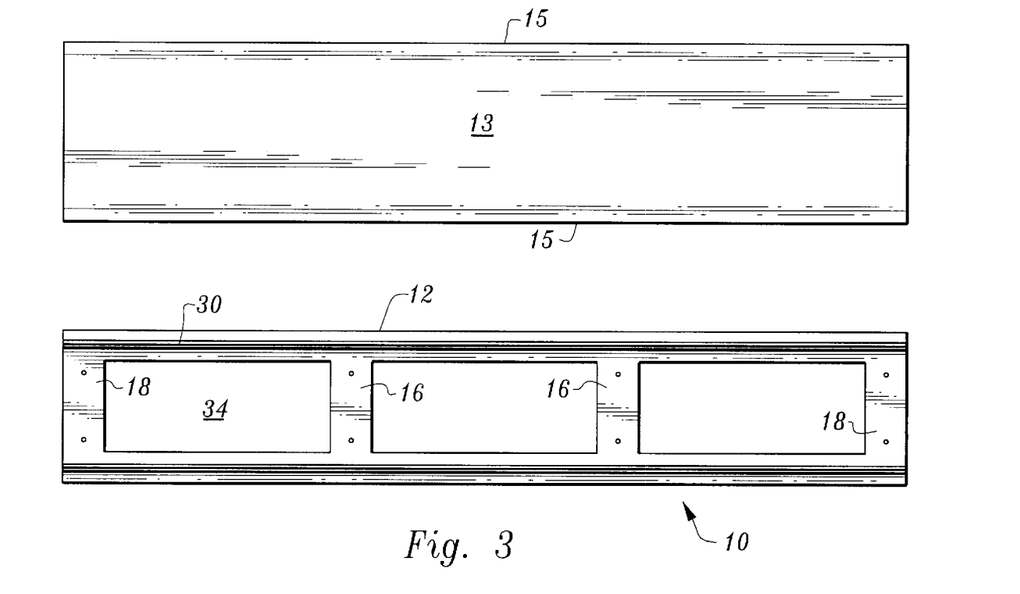
FIG. 3 is a front electrical view of the interior face of the utility access receiver and the exterior face of the cover member.

In FIG. 3, the two primary components of this first device 10 are seen. They are deemed primary because their shapes are the most utilized. The width of these two components may be 16 or 24 inches wide, the usual spacing between studs or some other dimension such as 12 or 18 inches as may be desired if special stud placement distances different from those of the Uniform Building code requirements are to be employed.

Figure 12:
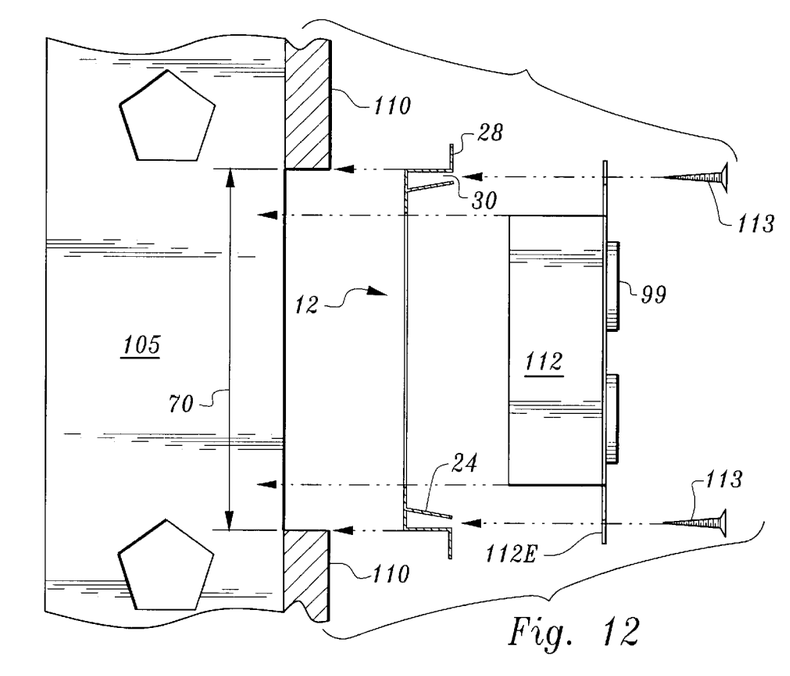
FIG. 12 is a diagrammatic illustration of the installation of the base frame forming a part of this invention.

The elevation of the base frame and of the cover section have been preselected to match the elevation to permit a standard electrical box 112, per FIG. 12 to fit in the opening 34 of the base frame. The elevation of the cover member 13 has been chosen to be equal to the elevation of a gang box cover plate, 116, a cable TV cover plate or 117 as seen in FIG. 1. Designator 118 relates to a blank cover plate, a term known to the art, rather than to a few inches wide section of cover member in FIG. 1. The use of a blank plate 118 over an unseen box is preferred to the disposition of a small section of cover member because of the side chamfer of the cover plates 117, electrical and 119, a telephone modular plug connection plate will blend in better with the side chamfer of other conventional cover plates such as aforesaid. The conventional cover plates are all 4½ inches high whether used to cover switches, television cable connections, electrical outlets, etc. Reference is also made to the discussion infra with respect to the cover member 59 shown also in FIG. 9

In order to match the curvature of a typical box cover plate, the cover member 13 and its counterpart in the second embodiment as well, has been rounded at both the top and bottom edges to achieve a maximum aesthetically pleasing match to the cover plates adjacent.

Figures 5, 7:
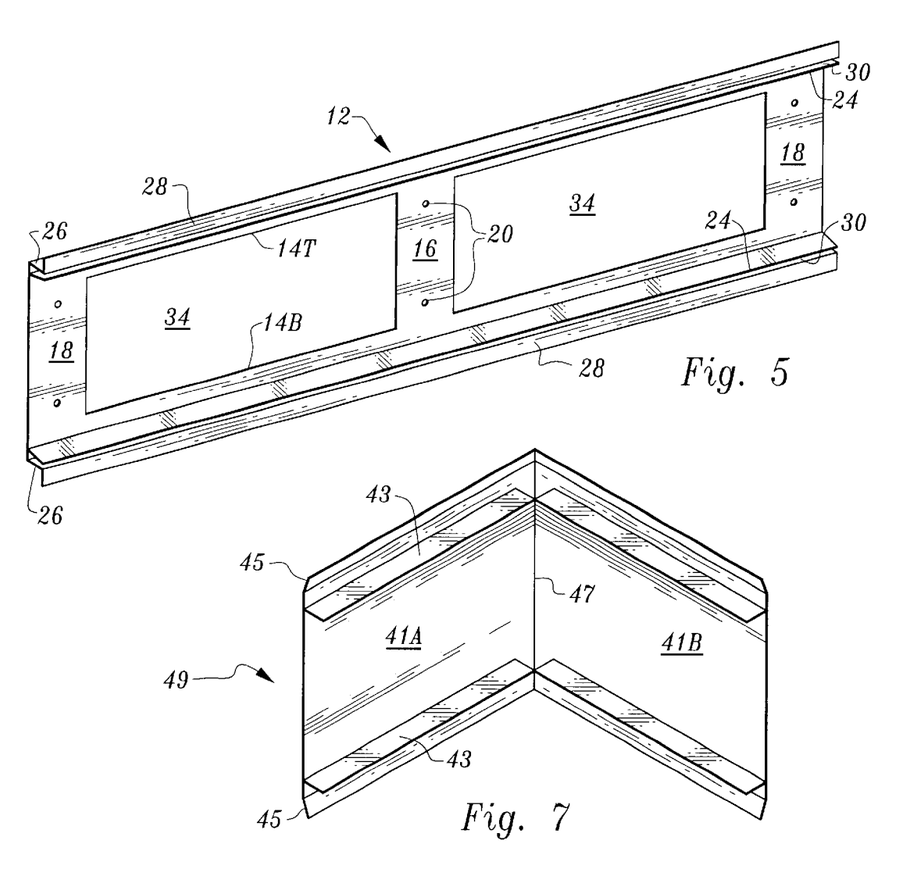
FIG. 5 is a closeup of the utility access receiver here called a base frame of the invention.
FIGS. 6 and 7 are inside and outside corner areas to be employed in the invention.

As can be seen in FIG. 5, base frame 12 includes spaced upper and lower elongated horizontal planar sections, connected by a central vertical planar section 16 and two spaced planar vertical end sections 18. Central section 16 is employed to provide stability to the base frame. Nail/screw indentations, 20 are provided for the location where a fastener is to be applied. In the alternative actual holes could be provided if desired. The spacing between the horizontal sections defines a zone 34 for the receipt of electrical component boxes therein. See also FIGS. 3 and 5. In some instances, depending on the elongation of the unit, rather than have a single central vertical planar section, a plurality of spaced interior planar sections are employed.

Turning again to FIG. 5, more details of the obverse side of the base frame may be seen. As can be seen here, along the length of each of the horizontal sections 14 is a forwardly disposed segment 26 which preferably runs the full length of the spaced horizontal section 14. These segments are disposed in a mirror image relationship, i.e., at the upper edge of the upper section 14, designated 14T, and at the lower edge of the lower section 14, designated 14B.

Whereas each segment, 26 is forwardly normal to its horizontal section 14, a pair of spaced segments 24, ,is each vertically interiorly disposed relative to their respective forwardly disposed segment along the length of the horizontal sections, and spaced from their respective forwardly disposed segments and angularly disposed to their respective horizontal section 14 at about a 90-degree angle. See also FIG. 12. Thus in the first embodiment the leading edge or forward edge of 24 is spaced closer to adjacent forward segment 26 than is the distal end of the angular segment 24. Slot 30 is the space between the two elongated segments 26 and 24 of both the upper and lower pairs of segments 24, 26.

Disposed vertically upwardly above upper member 14 and disposed vertically downwardly from segment 26 and disposed vertically outwardly 14, leading from segment 26 at the bottom is a pair of flanges 28 in the first embodiment. These flanges 28 are used to rest the base frame against the sheet rock 110. See FIG. 12. This little flange provides utility in not permitting the base frame to be pushed into slot 106 in the dry wall, if excess pressure is placed on the inventive device or the base frame alone. Thus in FIG. 12, no nails or screws are shown attaching flange 28 to the sheet rock. Flanges 28 may be omitted if desired, provided that a sufficiently heavy grade of material such as plastic is used for the balance of component 12 to inhibit breaking upon an application of force.

Figure 4:
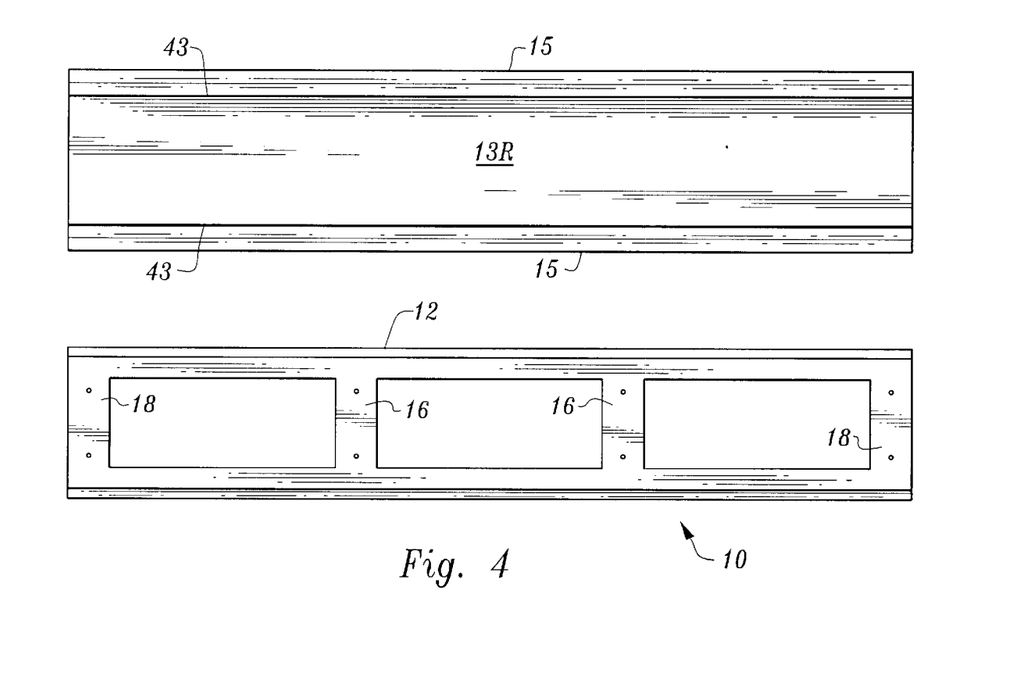
FIG. 4 is a view similar to FIG. 3 but of its exterior face of the utility access receiver and the interior of the cover member.

FIG. 4, depicts the two elements of FIG. 3 in opposite disposition. Whereas in FIG. 3 the interior surface of the base frame 12 is seen, and the exterior face of the cover member is seen, in FIG. 4 the exterior face of the base frame is seen and the interior face of the cover member 13R which R stands for reverse, is seen. The reverse face of the cover member engages the obverse face of the base frame 12. Note that in both embodiments, the front face of the cover member has the exact same appearance.

This engagement is achieved by a pair of edge located forwardly extending spaced splines 43, best seen in FIG. 4 which are found on the rear face 13R of the cover member. Each spline 43 runs preferably the full length of the cover member 13. The spacing between these outward extending splines is such that each will matingly engage the respective slot 30 formed between the angled segment 24 and the forward segment 26 located on the front surface of the base frame adjacent to both the top and bottom edges, along the length thereof. See FIG. 14, where such engagement is shown in process. It is to be noted from FIG. 4 that the cover member 13 depicted is of lesser elongation than the base frame 12 since part of the length of the base frame will have electrical components disposed in an electrical gang box. The electrical box is to be covered over by a conventional cover plate as is discussed elsewhere herein. Obviously the more components, to be added at the site, the larger number of individual boxes, mounted side by side or a multiple gang box will be employed. Such electrical boxes are well known to electricians.

Figure 6:
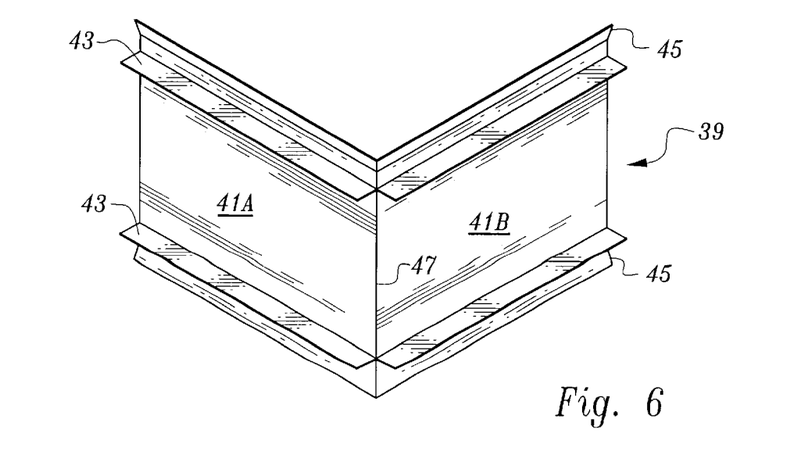

In FIGS. 6 and 7, are seen complimentary cover members 39 and 49. Whereas cover member 11 has a flat main section 13, these two corner covers members 39 and 49 have two intersecting main sections 41A and 41B. Cover member 39 is an inside corner and cover member 49 is an outside corner member. Note however that the base frame need not be made in L-shape corner configurations, since two flat base frame members of a finite length can be positioned in a normal (90°) relationship.

Each cover 39, 49 is seen to comprise a pair of main sections 41A, 41B joined at a vertical interface 47. Each main section 41A, 41B has an inwardly directed spline disposed in the interior surface of the main section, one spline spaced down from the upper edge and one spline spaced up from the lower edge of the rear face of each section 41A, 41B. Note also that the front face of each of 41A and 41B have chamfered upper and lower edges designated 45. These two chamfered edges compliment the chamfered edges of cover plates 116, 117 as is in the units of FIG. 1, and as are commonly available in the marketplace.

Figures 8, 9, 10:
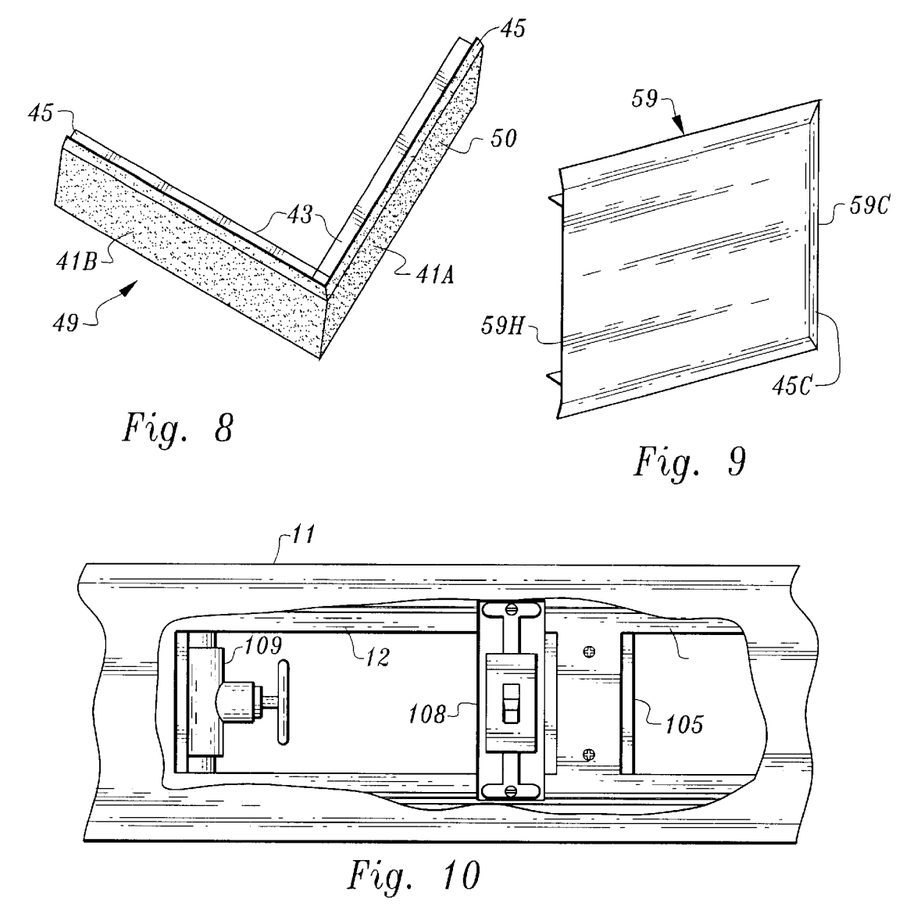
FIG. 8 is a top perspective closeup view of the exterior face of the cover of FIG. 6.
FIG. 9 is the exterior perspective view of an end cap according to this invention.
FIG. 10 is a cutaway view showing upgrading of a room wherein the utilities are unseen by a room visitor.

In FIG. 8, the obverse faces of the corner cover 49 are seen. Here one of the segments is designated 41 since it is unpainted. While the other face is coated with a coat of latex paint 50 thereupon. This illustrates that the cover plate portion of this invention can be used with any interior. Cover corner 49 may be configured for either embodiment on its interior surface, the primary difference being the splines contrast FIG. 13 with FIG. 19.

FIG. 9, illustrates an intermediate cover 59 member which is used in a special situation as seen in FIG. 1. The placement of such an intermediate cover 59 is intended for use where the base frame is of an extension less than the extension of the wall, 101. This is seen to be the case in FIG. 1. Contrast the extension of the device in wall 103 with the extension of the device in wall 101 of FIG. 1. The intermediate cover 59 may be of any width as may be desired but lengths of less than 6 inches is deemed convenient for manufacture and distribution. In most instances, a length equal to the width of a conventional cover plate is suggested for ease in measuring by the installer. In all respects intermediate cover member 59 may be of the nature of either the first or second embodiment on the reverse side for the splines, the discussion herein being centered on the obverse face. The cover member 59 will have a standard straight hard edge on one side and will have a chamfered side edge on the side which will be the terminus of the device, in order to enhance the aesthetics of the interface between the cover plate and sheet rock 110, due to the slight forward extension of the cover plate toward the persons in the room. This edge has been designated 59C, while the hard corner inside edge is designated 59H.

FIG. 10, illustrates the fact that electrical and other controls such as a water valve 109 or a switch 108 may be mounted for easy access by attachment to a stud 105, yet are only accessible by removal of a cover member 11.

Figure 11:
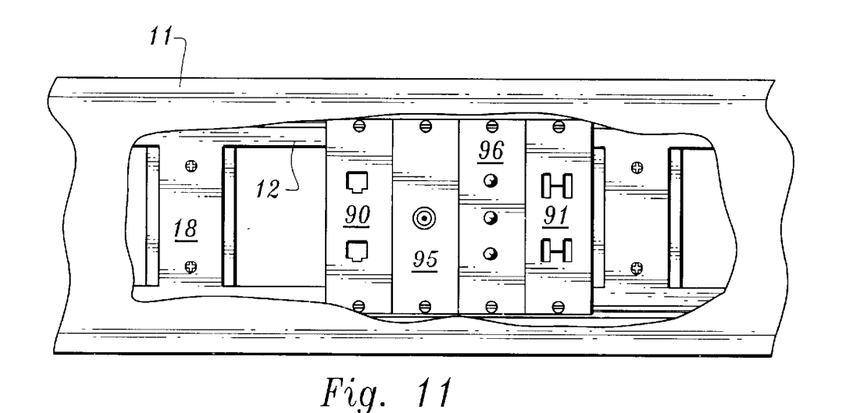
FIG. 11 shows the placement of various utility upgrade modules disposed in its back face of this invention.

FIG. 11, depicts a front view of a plurality of components mounted in a base frame. Thus components 90, 91, 95, 96, are seen without cover plates. Component 90 is a double modular phone jack, 95 is coax tv or cable connector, 91 is a double dimmer switch while 96 is an alarm status lite panel. All of these are readily available in the marketplace.

In FIG. 12, which is a side diagrammatic exploded view, the fit of an electrical component box into the base frame of this invention and the fit of the base frame 12 into the cut out in the drywall 110, are seen. The drywall 110 is seen attached here to metal stud 105, but the attachment to wood studs would be in like manner.

Box 112 is an off the shelf box of a standard size and is readily available from such vendors as LEVITON, and GEM among others. Such a box 112 will hold laterally at least one and up to four or five electrical components, such as switches, outlets and the like as depicted in FIG. 11, depending in the width of the box. The vertical member or wings 28 of the base frame rests against the drywall 110 to retain the base frame in position for this first embodiment only.

Screws 113 are used to attach the box 112 into the upper and lower slots of the base frame, such screws passing through an unnumbered threaded bore in the ear 112E of box 112. When the component in box 112 has been placed into position, per FIG. 12, a cover plate appropriate to the component, such as but not limited to cover plate 116 or 117 per FIG. 1 is applied with the screws shipped with the plate, in a conventional manner.

Figure 13:
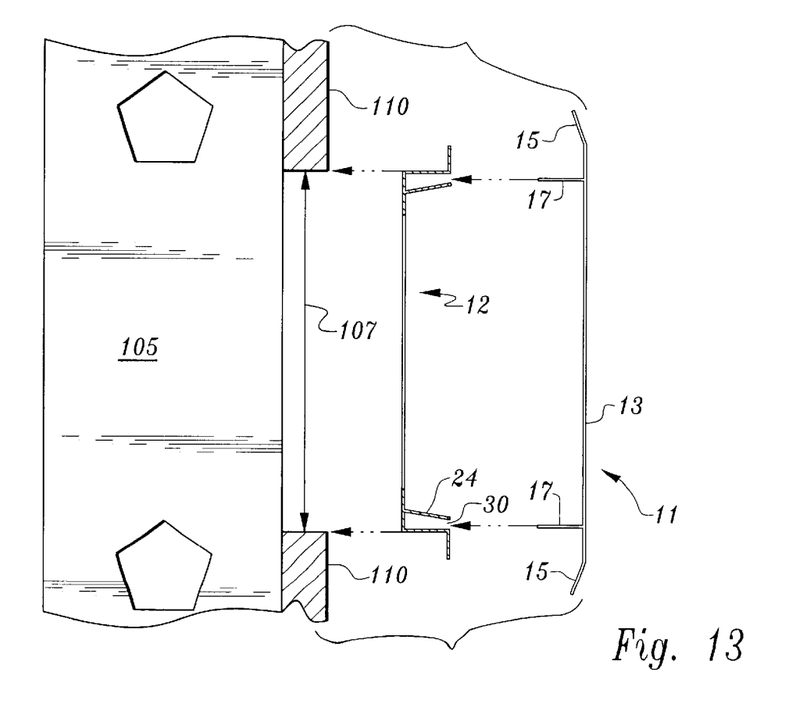
FIG. 13 is a side perspective view of the mounting of the cover plate component.

FIG. 13, depicts the engagement of the cover members 11, splines 17 engagement to the same slot 30 of the base frame 12. Such engagement would take place adjacent any engagements per FIG. 12. Reference is made to FIG. 1 which shows the lateral positioning of various cover plates over electrical components.

Figures 14, 15, 15A:
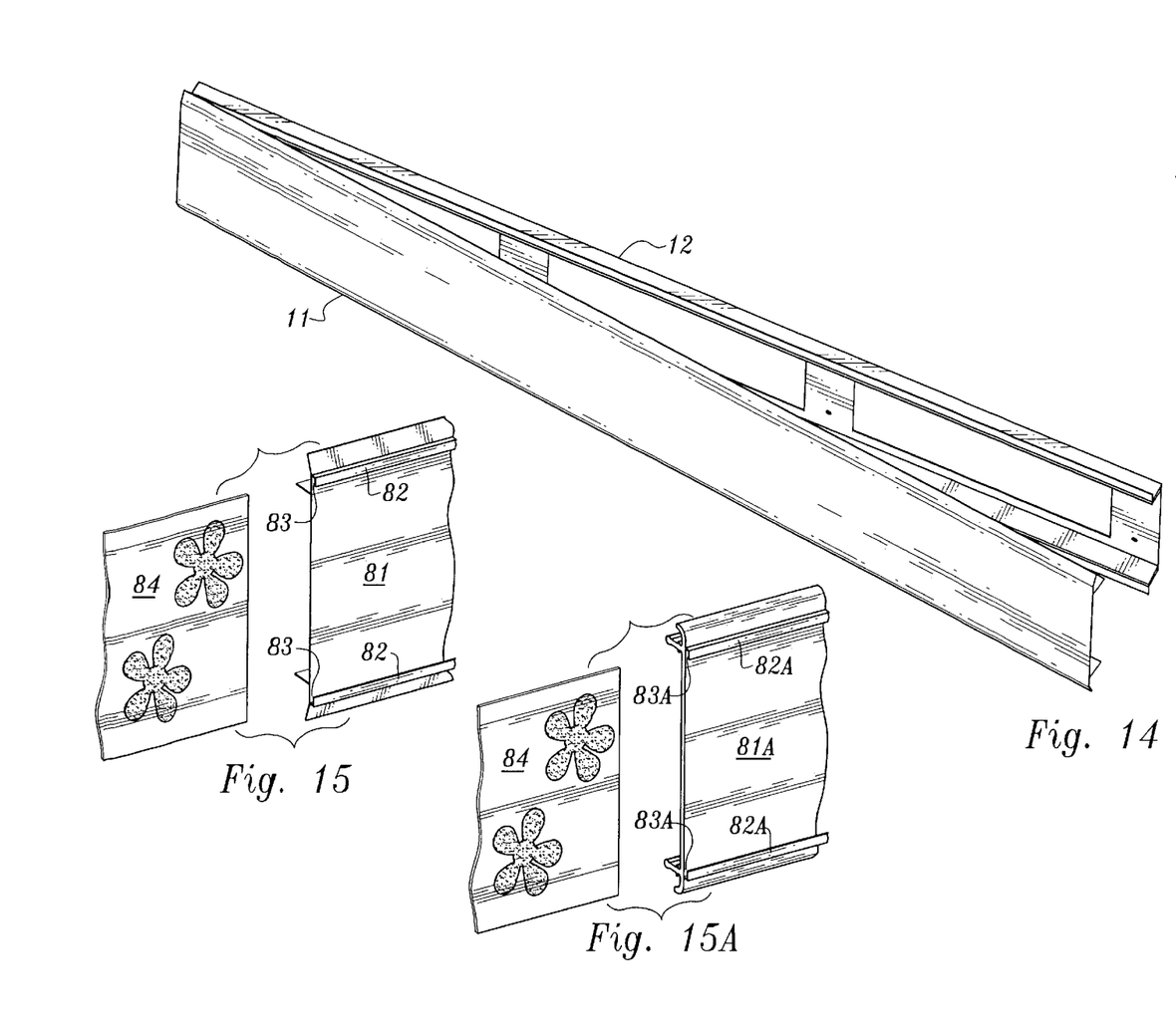
FIG. 14 is a top perspective view illustrating the engagement of the two components of the invention.
FIG. 15 and FIG. 15A is each a perspective view of a variant form of the cover members of this invention.

FIG. 14, depicts a point in time during the engagement discussed with regret to FIG. 13. While this view pertains to the first embodiment. The second embodiment's base frame and cover member are similarly friction fit engaged, though such is not separately illustrated, since the point is readily understood.

In FIG. 15, there is depicted a variant of cover member 11. This variant is designated 81. All aspects of variant cover member 81 are the same as are for cover member 11, but 81 also includes a pair of opposed mirror image L-shaped flanges 82 that protrude forwardly from the front face of the cover member 81. Wall paper slits into sections, such as 84 can be slid into the two L-shaped flanges for retention therein. The flanges 82 are preferably transparent, such as not to detract from the pattern of the wall paper 82. The slot 83 should be narrow enough to permit the paper 84 to be slid into position, and also to grab and retain the inserted wall paper 84.

In FIG. 15A, there is shown a similar second variant, applicable to the second embodiment of the invention, wherein all aspects of variant cover member 81A are the same as are for cover member 11, the cover member but element 81A has a slot 82A configured for the second embodiment's variant form to receive the wall paper insert.

As an alternative, certain wall papers 84, may be applied to the front base of a cover member 11 by a suitable adhesive, should the owner not want to go to the extra time and expense of using the variant cover member 81.

Figure 16:
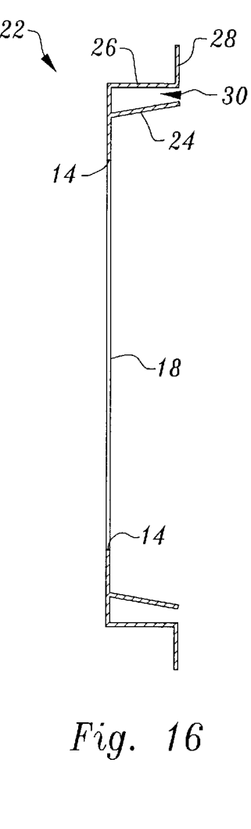
FIG. 16 is a side elevational view of the first embodiment of the base frame of this invention.

FIG. 16, is presented to help illustrate the various aspects of the first embodiment's base frame as the member 12 is shown here in closeup. Further discussion of base frame 12 is not needed as the aspects shown have been discussed earlier.

The cover member 11 and its counterpart to be discussed below may be made of any suitable plastic such as acrylic, polyvinyl chloride or polycarbonate. Polycarbonate is stronger, but more expensive. Polystyrene and A.B.S. (Acrylonitrile-Butadiene-Styrene) may also be employed for the cover member.

As to the base frame this may be molded of nylon, DELRIN®, polycarbonate or any other suitable plastic. Suitable colors of plastic include, clear, translucent white and opaque white. Color addition may be employed in special situations to match special wall materials where painting is either unacceptable or is not desired due to high impact potential.

The device as has been noted is preferably made of plastic as by extrusion, but metallic units, made by metal stamping and other processes are also contemplated.

Earlier in the discussion both inside and outside corner pre-made matching insert covers were disclosed. In some instances, due to the use of nonstandard corner angles as are often found in rooms, it will be necessary to manufacture the corner on site by using flat members butted together at the appropriate angle which can be achieved by the use of a simple hacksaw and the exercise of engineering skill.

Figure 17:
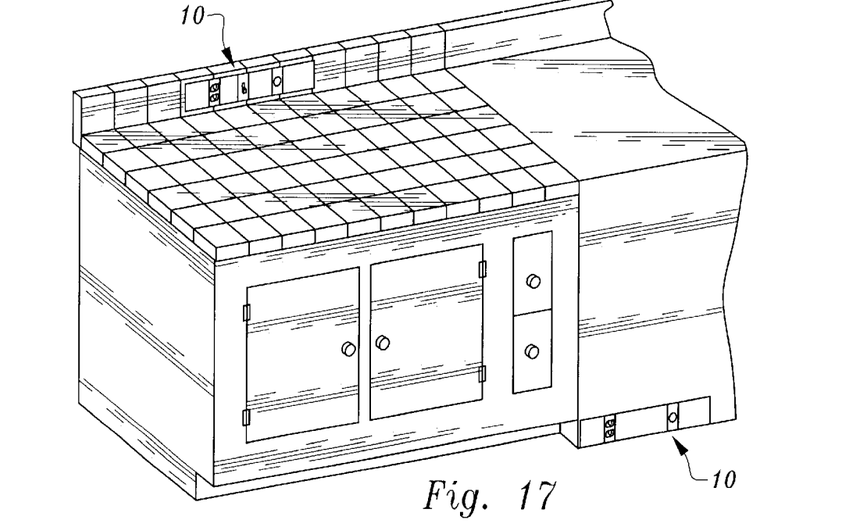
FIG. 17 is a perspective view illustrating the placement of this invention within a back splash behind a kitchen cabinet, and at a baseboard location.

The discussion now moves to FIG. 17. In addition to being employed either vertically or horizontally within a wall's elevation, the device of this invention can be used as a replacement for the baseboard to facilitate upgrading of today's homes with advanced low voltage wiring systems, in residential construction. It is again within the realm of engineering skill to provide a custom faceplate configuration to match special baseboard molding, as may be required. If desired, the device of this invention could be incorporated into a kitchen counter back splash. Both of these possibilities are depicted in FIG. 17 wherein a device 10 with the cover member in place is seen above the two door cabinet and in a baseboard position, adjacent thereto.

Figure 18:
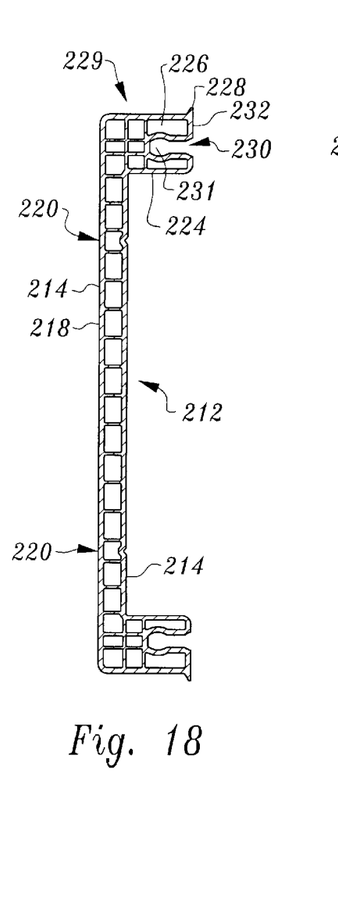
FIG. 18 is an end view of a second embodiment of this invention's base frame.

The reader is now referred to FIG. 18 wherein the base frame 212, of the second embodiment 200, is seen. Base frame 212 has the same general construction as the base frame previously described, in so far as configuration is concerned. That is, the base frame 212, has a pair of spaced vertical end sections 218 with at least one interior vertical section, not seen, all of which are disposed between spaced elongated top and bottom elongated sections, 214. In FIG. 18 an end view only the end vertical section 218 is seen and not the central section 214.

Each elongated horizontal section 214 includes a forward extending generally U-shaped segment 229, the two of which are disposed in a mirror image relationship. That is, segment 229 is disposed at the upper edge of the upper horizontal section and at the lower edge of the lower horizontal section. See FIG. 20. The segment 229 has an external arm 226 from which a slight tip or projection 228 extending normal to the extension of the arm 226. Arm 226 is spaced from internal arm 224 by slot 230. Both arms extend forwardly the same distance, designated the depth, 263, such that the configuration of the entire back frame when considered as a whole is U-shaped as well.

Slot 230 is formed in two parts. A first part 232 of uniform cross section along the entire length, usually about ¼ inch, and a preferably hexagonal in cross section bulbous second part 231 in communication therewith. First part 232 may include a slight chamfer to ease the entry of the bulbous spline to be described infra.

Designators 220 indicate the locations of dimples for potential mounting holes or for actual mounting holes depending on the manufacturing method chosen for the base frame. In any event the base frame would be mounted to the studs at these locations 220.

Figures 19, 20:
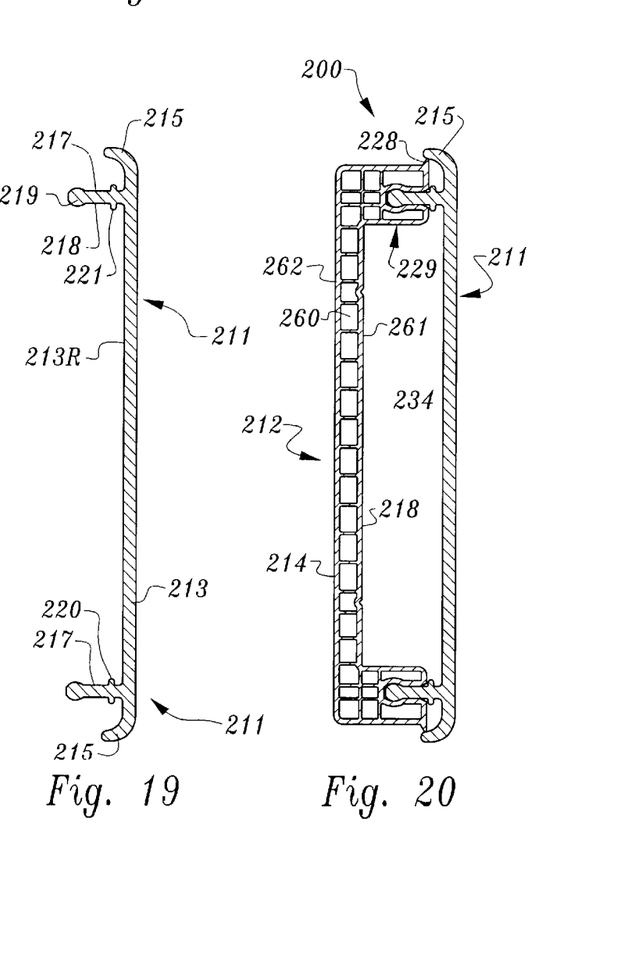
FIG. 19 is an end view of the cover member of the second embodiment of this invention.
FIG. 20 is a perspective view of illustrating the releaseable engagement of the cover plate of the second embodiment's cover member with the second embodiment base frame.

In FIG. 19 the cover member 211 of the second embodiment is seen. Cover member 211 is an elongated planar section 213, having a pair of inwardly rounded edges 215 along the length thereof, of a radius to match that of a conventional electrical outlet cover plate.

Disposed on the reverse side 213R of the planar section of cover member 211 are a pair of elongated spaced splines 217 having three parts thereto. The first part, the shaft is an elongated bar 218, with a pair of opposite extending detents 221 thereon, one extending upwardly and one downwardly, both in parallel to the planar section 213 both spaced slightly away a similar amount from the planar member 213. At the distal end of the shaft is the third part, an elongated bulbous preferably hexagonal part 219. The bulbous part and the shaft of the spline are sized to engage the slot 230's two elements 231 and 232 for a tight fit. The detents 221 prevent too deep penetration of the shaft 217 into the slot.

In FIG. 20,the engagement of the second embodiment 200's cover member 211 with the base frame 212 is seen. Visible in this view is opening 234 for the receipt of boxes with components therein as described supra.

Whereas in the first embodiment the base frame was constructed of solid material, of a finite thickness, the base frame here is formed of a skinned cellular material. The two skins are 261 and 262 with a plurality of closed cells 262 there between. Mention may be made of structural foams that may be formed from polyurethane, among other polymers as being suitable for the manufacture of the base frame of this embodiment.

In this view the role of the projection 228 is seen as being a slight support for the interior surface of the curved edge 215 of the cover member.

Previously the spacing of the central vertical section and the relative lengths of the two components, the base frame and cover member has been discussed. If the central vertical section (intermediate vertical sections) are positioned at 8 inches on centre apart, then the use of the same component with either 16 or 24 inches spaced studs can be accomplished.

Figure 21:
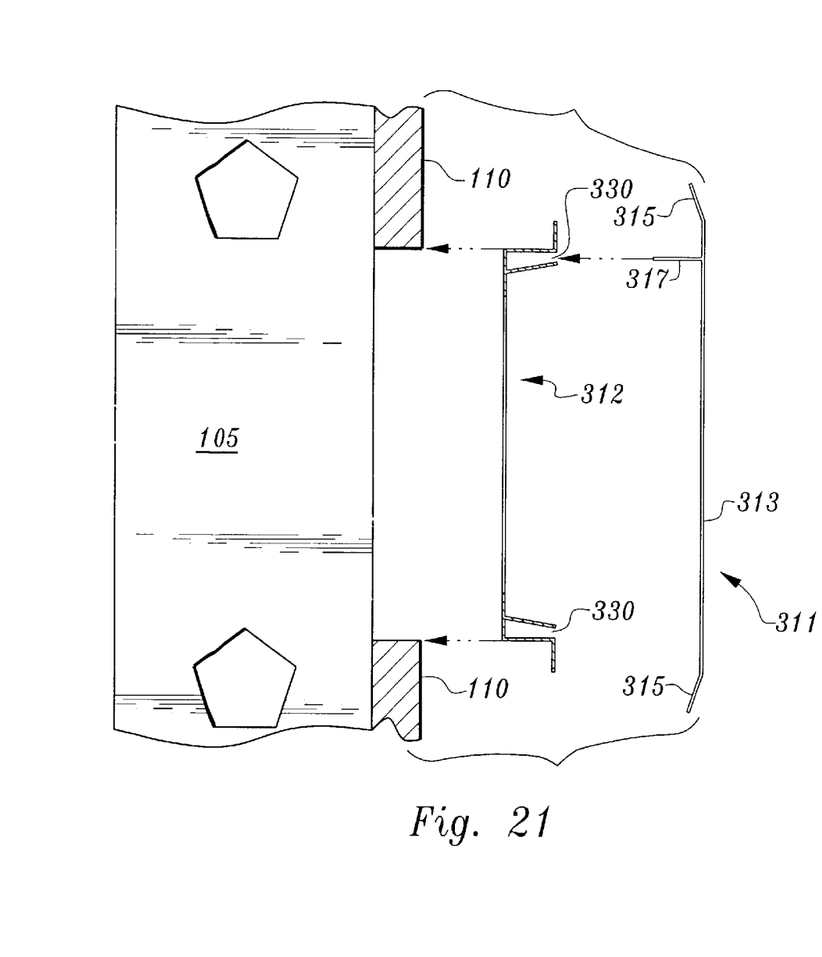
FIG. 21 is a side diagrammatic view of a variant of the first embodiment.
Figure 22:
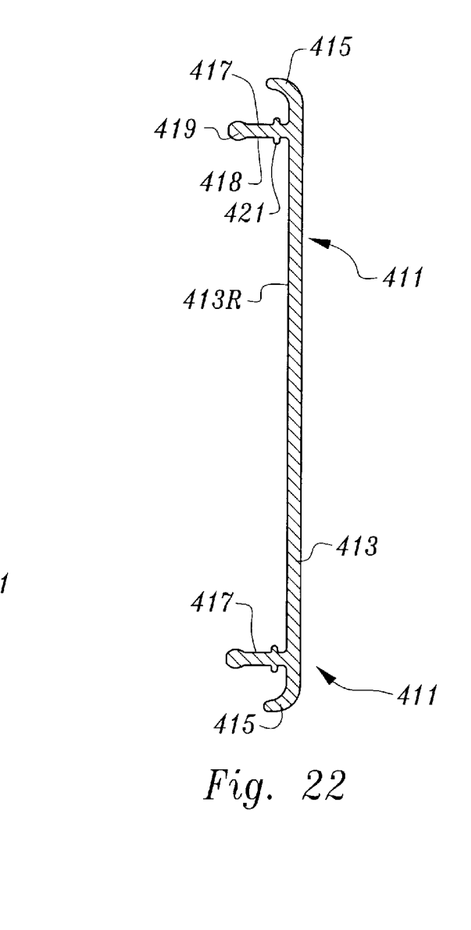
FIG. 22 is a side diagrammatic view of a variant of the second embodiment.

In addition to the two distinct embodiments shown, there exists a variant for each. The same variant applies to both embodiments. In such variants, as shown in FIGS. 21 and 22, instead of having a pair of splines spaced apart, only a single spline is utilized. Thus in FIG. 21 wherein like numbers represent like parts, all the elements designated in the 300 series have been described previously with respect to a two digit series numbers from 11 et seq of the first embodiment. In this embodiment the cover member, designated 311 has only a single spline 317, with the balance of the interior surface also known as the reverse side of the cover member being planar. Such a single spline configuration can be equally well employed for corner cover members similar to those shown in FIGS. 6 and 7 and to end of run cover 59 shown in FIG. 9.

In FIG. 22, the variant of the second embodiment is shown. Here the cover member is designated with numbers in the 400 series. All parts here are similar to their counterparts in the 200 series if not specifically described herein, but for the general descriptor of the planar main section as 413 of cover member 411. Here too, only one spline 417 is shown, rather than two spaced apart splines 217 as in embodiment two per FIG. 19.

Here too, the single spline variant can be fashioned for elongated cover members, corner cover members and end of run cover members on the order of element while a single spline cover member will be fully operative, the dual spaced apart spline versions of the two embodiments is preferred to ensure safety for children, as the two spline versions are more difficult to remove from their respective face frames thereby exposing the components when so removed.

It is seen that we have provided a new means for both updating existing structures to allow then to enter the information age at low cost by permitting the introduction of high and low voltage electrical and other component upgrades in a safe low cost efficient manner. In new construction an easy to use method of upgrading for the future can be achieved by the use of this invention.

The low cost and the fact that the product of this invention can be employed in as few as one unit, permits the homeowner to enjoy the benefits thereof in the same manner as commerce and industry which will use large numbers at a time.

Installation

It is also to be seen that the process for upgrading a building or home can be done quite easily, using only such tools as a keyhole or drywall manual saw or a scroll saw to make the appropriate drywall cut out for retrofit construction, in addition to standard screw drivers.

The base frame is placed into position, screwed to the metal or wood studs; the electrical boxes are screwed into the slots of the base frame at the desired locations, the cover plate(s) is applied over the components, and adjacent cover members are engaged into position with the slots of the base frame.

While most sheet rock is ½ to ¾ inch thickness, certain Uniform Building Code Regulations require a doubling of the thickness to retard fires for a finite time period. The device of this invention can be utilized with any thickness of sheet rock, also known as gypsum board.

It is also to be understood that while shown installed in a standard horizontal disposition, the device of this invention can also be just as easily installed in a vertical disposition. Of course if the devices are to be used in a vertical disposition as is also contemplated, then there is no actual limit on the length. However for marketing and manufacturing purposes, a three foot long unit for home use, and an 8 foot long unit for new construction and commercial use, are practical suggestions. On the other hand, if to be placed between floor or ceiling joists, spacer units that are 12 inches on centre may be preferred.

It is also to be seen that if desired, the product of this invention may be surface mounted over the sheet rock, rather than within a cutout sized to fit the device of this invention. Should one desire to surface mount the device, on top of the sheet rock, the user will need to carry out the following steps. First, find either the left or right hand stud to which the base frame is to be ultimately attached. A stud finder such as sold by Zircon and others will do so. Second, calculate the distance to the centre of the next stud and locate all of studs to which the length of base member will be secured. Using appropriate fasteners, attach the length of base frame through the sheet rock to the studs. Fourth, by employing the opening 34, in the base frame as a template, one can carefully cut an opening of the desired width and the standard elevation to hold the desired size electrical box, using a keyhole or SAWZALL® saw. The electrical box(es) are then screwed into the base frame, the components added and the job completed in like manner as with a recessed installation.

From the discussion, it is seen that while the intended user may purchase both base frame and cover member in the same lengths, as a kit, less length of cover member will be employed, the actual length depending upon the number of electrical or other components are installed along the length of the base frame. The reason for such is because the remaining space of the base frame is covered over by cover plates of the various components.

While the product of this invention may be molded in plastic of almost any color from black to white, the flat outer surface of the cover member—even with the curved upper and lower edges thereof—, lends itself easily to the process of hot stamping of decorative indicia such as wood graining, or marbleizing thereon.

The device of this invention can, as noted earlier be installed spaced up from the flooring or spaced down from the ceiling. To further enhance, the appearance of the device and/or to help it blend into the decor, especially when the cover member has been hot stamped or received a wall paper insert as discussed supra, molding such as base board, or crown molding may be used in conjunction therewith. In a recess mount situation, the molding will need to be spaced slightly such as ⅛ inch, from the cover member to permit easy removal with a blade tip, as may be required. For surface mounting installations, the molding may be adhesed directly to the upper and lower depth surfaces 263 per FIG. 20. Such molding would attach behind the lip 268 on the depth surface 263. Any configuration may be employed for such molding so long as its depth is not excessive, which fact would interfere with both the attachment thereof to the base frame and would interfere with the removal of the cover member.

Since certain changes may be made in the above device and process without departing from the scope of the invention herein involved, it is intended that all matter contained in the above description and shown in the accompanying drawings shall be interpreted as illustrative and not in a limiting sense.

We claim:

1. A device to permit utilities connections to be added to a wall of a building, said device comprising:

a base frame adapted for attachment to adjacent wall studs, said base frame having spaced upper and lower elongated horizontal sections, connected by a central section to provide stability and spaced vertical end sections, the spacing between horizontal sections defining a zone for the receipt of electrical component boxes therein; each of the horizontal sections having an upper edge and a lower edge, said base frame's horizontal sections each having a forwardly extending, slot containing, segment in mirror image relationship at the upper edge of the upper section, and at the lower edge of the lower horizontal section;

wherein the distance between the slot of the upper horizontal section and the slot of the lower horizontal section of the base frame coincides with the distance between the mounting screws on the flanges of conventional electrical components for the securement thereof to the base frame;

a cover member having obverse and reverse sides, with a pair of edges located spaced elongated splines, each one of which is adapted to matingly engage one of the slots on said base frame.

2. In the device of claim 1 wherein each of said vertical sections has nail/screw indentations, at locations where a fastener is to be applied.

3. In the device of claim 1 wherein the forwardly extending segments each have a flange extending normal thereto disposed away from each other.

4. A device to permit utilities connections to be added to a wall of a building which device comprises:

a base frame, adapted for attachment to adjacent wall studs, said base frame having spaced upper and lower elongated horizontal sections, connected by spaced vertical end sections and at least one planar interior vertical section to provide stability, the spacing between horizontal sections defining a zone for the receipt of electrical component boxes therein; each of the horizontal sections having an upper edge and a lower edge, said base frame's horizontal sections each having a forwardly extending, slot containing, segment in mirror image relationship at the upper edge of the upper section, and at the lower edge of the lower horizontal section;

wherein the distance between the slot of the upper horizontal section and the slot of the lower horizontal section of the base frame coincides with the distance between the mounting screws on the flanges of conventional electrical components for the securement thereof to the base frame;

a cover member comprising a planar section having obverse and reverse sides, with a pair of edge located spaced elongated splines, each one of which is adapted to matingly engage one of the slots on said base frame.

5. The device of claim 4 wherein the base frame includes means thereon through which attachment is made to studs; and the cover member has chamfered edges along the length thereof.

6. The device of claim 4 wherein the base frame's each elongated horizontal section has an equally forwardly extending generally U-shaped segment, the two of which are disposed in a mirror image relationship.

7. The device of claim 6 wherein each U-shaped segment has an internal arm and an external arm, the external arm of each having a slight tip disposed normal to the forward extension of the segment.

8. The device of claim 4 wherein the cover member's splines, each have as a first part, a shaft being an elongated bar, with a pair of opposite extending detents thereon to prevent too deep penetration of the shaft, one extending upwardly and one downwardly, both in parallel to the planar section and both spaced slightly away a similar amount from said planar section, while disposed at the distal end of the shaft is an elongated bulbous part, both said bulbous part and said shaft being sized to engage a slot of said base frame.

9. The device of claim 8 wherein the base frame and the cover member are each made as one piece integrated components.

10. The device of claim 9 wherein the base frame is a skinned cellular structure.

11. The device of claim 9 wherein the at least one planar interior vertical sections are spaced at 8 inches on centre intervals.

12. A device to permit utilities connections to be added to a wall of a building, said device comprising:

a base frame adapted for attachment to adjacent wall studs, said base frame having spaced upper and lower elongated horizontal sections, connected by a central section to provide stability and spaced vertical end sections, the spacing between horizontal sections defining a zone for the receipt of electrical component boxes therein; each horizontal section having an upper edge and a lower edge;

said base frame's horizontal sections each having a forwardly extending, slot containing, segment in mirror image relationship at the upper edge of the upper section, and at the lower edge of the lower horizontal section;

wherein the distance between the slot of the upper horizontal section and the slot of the lower horizontal section of the base frame coincide with the distance between the mounting screws on the flanges of conventional electrical components for the securement thereof to the base frame;

a cover member having obverse and reverse sides, with a single edge located elongated spline, which is adapted to matingly engage one of the slots on said base frame.

13. A device to permit utilities' connections to be added to a wall of a building which wall comprises sheet rock attached to spaced studs, which device comprises:

a base frame, adapted for attachment to adjacent wall-studs, in a slit in the sheet rock, said base frame having spaced upper and lower elongated horizontal sections, connected by spaced vertical end sections and at least one planar interior vertical section to provide stability, the spacing between horizontal sections defining a zone for the receipt of electrical component boxes therein; each horizontal section having an upper edge and a lower edge;

said base frame's horizontal sections each having a forwardly extending, slot containing, segment in mirror image relationship at the upper edge of the upper section, and at the lower edge of the lower horizontal section, the elevation of the base frame corresponding to the size of the slit in the sheet rock needed to permit attachment to adjacent wall studs, a cover member comprising a planar section having obverse and reverse sides, with a single edge located elongated spline, which is adapted to matingly engage one of the slots on said base frame.

14. A device to permit utilities connections to be added to a wall of a building which device comprises:

a base frame, adapted for attachment to adjacent wall studs, said base frame having spaced upper and lower elongated horizontal sections, connected by spaced vertical end sections and at least one planar interior vertical section to provide stability, the spacing between horizontal sections defining a zone for the receipt of electrical component boxes therein; each of the horizontal sections having an upper edge and a lower edge, said base frame's horizontal sections each having a forwardly extending, slot containing, segment in mirror image relationship at the upper edge of the upper section, and at the lower edge of the lower horizontal section, a cover member comprising a planar section having obverse and reverse sides, with at least one and no more than two edge located elongated splines, and if two they are spaced apart vertically, each one of which present is adapted to matingly engage one of the slots on said base frame;

and wherein the cover member's at least one spline's, first part, a shaft being an elongated bar, with a pair of opposite extending detents thereon to prevent too deep penetration of the shaft, one extending upwardly and one downwardly, both in parallel to the planar section and both spaced slightly away a similar amount from said planar section; while disposed at a first end, the distal end of the shaft is an elongated bulbous part, both said bulbous part and said shaft being sized to engage a slot of said base frame.

15. The device of claim 14 wherein the cover member has a single edge located spline.

16. The device of claim 14 wherein the cover member has a pair of edge located spaced splines.

17. A device to permit utilities connections to be added to a wall of a building, which wall comprises sheet rock attached to spaced studs, said device comprising:

a base frame adapted for attachment to adjacent wall studs, in a slit in the sheet rock said base frame having spaced upper and lower elongated horizontal sections, connected by a central section to provide stability and spaced vertical end sections, the spacing between horizontal sections defining a zone for the receipt of electrical component boxes therein; each horizontal section having an upper edge and a lower edge; said base frame's horizontal sections each having a forwardly extending, slot containing, segment in mirror image relationship at the upper edge of the upper section, and at the lower edge of the lower horizontal section;

the elevation of the base frame corresponding to the size of the slit in the sheet rock needed to permit attachment to adjacent wall studs;

a cover member having obverse and reverse sides, with a single edge located elongated spline, which is adapted to matingly engage one of the slots on said base frame.

18. A method for installing a device for upgrading the electrical based utilities of a building, if present, which process comprises:

cutting an elongated slot in the dry wall of a building between at least two studs, in which room it is desired to add any and all of television, telephone, computer network, AC electrical and the like lines for such room having drywall walls;

mount a base frame of finite length to the studs within said slot, said base frame to be equal in length to said slot;

dispose one or more electrical boxes within the base frame at one or more locations within the finite length of the base frame;

connect the lines of the desired utilities from known sites to the one or more boxes within the base frame and connect the lines to the respective desired electrical component for said electrical box; and mounting said component into its respective electrical box;

cut a sized length of a cover member having at least one spline thereon, equal to the distance from the commencement of the finite length of the base frame to the first of said boxes, and also of lengths between each of said boxes which are spaced apart from each other, if any, and one length between the last of said boxes and the end of said base frame;

engage said cover member lengths to said base frame.

19. The process of claim 18 including the further step of applying cover plates to each of the electrical boxes installed in said base frame.

20. A method for installing a device for adding electrical based utility lines of an under construction building room having stud-based wall supports, which process comprises:

running the desired utility lines into the room in which it is desired to add any and all of television, telephone, computer network, AC electrical and the like for such room;

mount a base frame of finite length to the studs of said wall to be, said base frame to be lesser in length than the length of said wall to be;

dispose one or more electrical boxes within the base frame at one or more locations within the finite length of the base frame;

connect the lines of the desired utilities from known sites to the one or more boxes within the base frame and connect the lines to the respective desired electrical component for said electrical box; and mounting said component into its respective electrical box;

cut a sized length of a cover member having at least one spline thereon, equal to the distance from the commencement of the finite length of the base frame to the first of said boxes, and also of lengths between each of said boxes which are spaced apart from each other, if any, and one length between the last of said boxes and the end of said base frame;

engage said cover member lengths to said base frame.

21. The process of claim 20 including the further step of applying sheet rock to the studs of the wall under construction.

* * * * *